United States Patent
Wu et al.

(10) Patent No.: US 12,399,930 B2
(45) Date of Patent: Aug. 26, 2025

(54) INFORMATION SEARCHING METHOD AND DEVICE, COMPUTER EQUIPMENT AND STORAGE MEDIUM

(71) Applicant: Beijing Bytedance Network Technology Co., Ltd., Beijing (CN)

(72) Inventors: Ping Wu, Beijing (CN); Ruiqi Peng, Beijing (CN); Lei Zhao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/448,749

(22) Filed: Aug. 11, 2023

(65) Prior Publication Data

US 2023/0385328 A1    Nov. 30, 2023

Related U.S. Application Data

(63) Continuation of application No. PCT/CN2022/091077, filed on May 6, 2022.

(30) Foreign Application Priority Data

Jun. 30, 2021   (CN) .......................... 202110738425.2

(51) Int. Cl.
    *G06F 16/435*    (2019.01)
    *G06F 16/438*    (2019.01)
(52) U.S. Cl.
    CPC .......... *G06F 16/435* (2019.01); *G06F 16/438* (2019.01)
(58) Field of Classification Search
    CPC ........ G06F 16/248; G06F 16/33; G06F 16/43; G06F 16/433; G06F 16/435;
    (Continued)

(56) References Cited

U.S. PATENT DOCUMENTS 6,564,213 B1   5/2003   Ortega et al.
8,700,639 B1   4/2014   Datar et al.
                  (Continued)

FOREIGN PATENT DOCUMENTS

CN   105657567 A   6/2016
CN   108227954 A   6/2018
                  (Continued)

OTHER PUBLICATIONS

Notification to Grant Patent Right for Invention in CN202110738425. 2, mailed Nov. 18, 2022, 3 pages.

(Continued)

*Primary Examiner* — Robert W Beausoliel, Jr.
*Assistant Examiner* — Cheryl M Shechtman
(74) *Attorney, Agent, or Firm* — Astute IP Law Group

(57) ABSTRACT

Methods and apparatuses for information searching, computer devices and storage mediums display associated query information and a live indicator to suggest a query associated with a live broadcast. The method includes receiving initial query information input in a search box on a display of an electronic device. The initial query information includes any one of characters, keywords, and key phrases. The method includes displaying, on the display of the electronic device prior to initiating a search on the initial query information, associated query information and a live identifier associated with the initial query information in a predetermined position other than the search box, the live identifier being used to indicate that a multimedia content with which the associated query information is associated is being broadcast live.

11 Claims, 7 Drawing Sheets

(58) Field of Classification Search
CPC .... G06F 16/438; G06F 16/48; G06F 16/5866; G06F 16/686; G06F 16/70; G06F 16/78; G06F 16/7867; G06F 16/9538; G06F 16/955

See application file for complete search history.

(56) References Cited

U.S. PATENT DOCUMENTS

| | | | |
|---|---|---|---|
| 8,713,024 | B2 | 4/2014 | Risvik et al. |
| 9,619,554 | B2 | 4/2017 | Liu et al. |
| 2013/0073582 | A1* | 3/2013 | Krishnamoorthy ............... G06F 16/9537 707/769 |
| 2013/0117297 | A1 | 5/2013 | Liu et al. |
| 2015/0149482 | A1 | 5/2015 | Finkelstein et al. |
| 2016/0050389 | A1* | 2/2016 | Fiero ................ H04L 12/1813 348/14.07 |
| 2016/0098416 | A1 | 4/2016 | Li |
| 2017/0075536 | A1* | 3/2017 | Cho .................... G06F 3/0482 |
| 2017/0193064 | A1* | 7/2017 | Judd ................... G06F 16/248 |
| 2020/0272669 | A1* | 8/2020 | Ebbesen ............ G06F 16/9538 |

FOREIGN PATENT DOCUMENTS

| | | |
|---|---|---|
| CN | 111131875 A | 5/2020 |
| CN | 111327916 A | 6/2020 |
| CN | 111382355 A | 7/2020 |
| CN | 111556327 A | 8/2020 |
| CN | 111611492 A | 9/2020 |
| CN | 111641840 A | 9/2020 |
| CN | 111708943 A | 9/2020 |
| CN | 112182342 A | 1/2021 |
| CN | 112272302 A | 1/2021 |
| CN | 113378058 A | 9/2021 |
| JP | H08-287077 A | 11/1996 |
| JP | 2001-282828 A | 10/2001 |
| JP | 2014-167815 A | 9/2014 |
| JP | 2017-525022 A | 8/2017 |
| WO | 2017008498 A | 1/2017 |

OTHER PUBLICATIONS

International Search Report in PCT/CN2022/091077, mailed Jul. 21, 2022, 3 pages.

Search Report in CN202110738425.2, mailed Oct. 31, 2022, 3 pages.

Extended European Search Report for European Application No. 22831426.6, mailed Jun. 14, 2024, 7 pages.

Office Action for Brazilian Patent Application No. BR112023017149-0, mailed Aug. 28, 2024, 6 pages.

"From Basic Operations to Advanced Features Complete Mastery of Line", KK Sansai Books, Radio Life, vol. 37, No. 13, Date Unknown, 16 pages, with translation of relevancy from Japanese Office Action.

Office Action for Japanese Patent Application No. 2023-549611, mailed Sep. 17, 2024, 10 pages.

* cited by examiner

INFORMATION SEARCHING METHOD AND DEVICE, COMPUTER EQUIPMENT AND STORAGE MEDIUM

CROSS REFERENCE TO RELATED APPLICATIONS

The disclosure is a continuation of PCT application Ser. No. PCT/CN2022/091077, titled "INFORMATION SEARCHING METHOD AND DEVICE, COMPUTER EQUIPMENT AND STORAGE MEDIUM", filed on May 6, 2022, which claims priority to Chinese Patent Application No. 202110738425.2, field on Jun. 30, 2021, and entitled "INFORMATION SEARCHING METHOD AND DEVICE, COMPUTER EQUIPMENT AND STORAGE MEDIUM", the entire contents of both of which are incorporated herein by reference.

TECHNICAL FIELD

The present disclosure relates to the field of Internet technology, and in particular, to a method and apparatus for information searching, a computer device and a storage medium.

BACKGROUND

With the continuous development of Internet technology, webcasting has gradually become a new way of socializing. Webcasting utilizes video for online broadcasting, which can display goods, daily life of people and other contents in real time, and users can watch the live content of interest via the terminal application or website, so as to enrich their lives.

In general, a user needs to input query information on a terminal application or a website to initiate a search, further find live content that he or she wants to watch among search results. Very often, after users input query information, there may be no corresponding live content in the search results, or it takes a lot of time to perform a search for the live content among the search results, or it is difficult to know how to find the live content intended to watch.

SUMMARY

Embodiments of the present disclosure provide at least a method and apparatus for information searching, a computer device and a storage medium.

The first aspect of the embodiments of the disclosure provides a method for information searching, comprising:
  receiving initial query information input in a search box, the initial query information comprising any one of characters, keywords, and key phrases;
  displaying associated query information and a live identifier associated with the initial query information in a predetermined position other than the search box; the live identifier being used to indicate that a multimedia content with which the associated query information is associated is being broadcast live, and the initial query information being matched with at least one attribute characteristic of the multimedia content.

The second aspect of the embodiments of the disclosure provides a method for information searching, comprising:
  receiving initial query information which is sent by a client and input in a search box; the initial query information comprising any one of characters, keywords, and keyword phrases;
  determining associated query information associated with the initial query information; a multimedia content with which the associated query information is associated being broadcast live; and
  sending the associated query information to the client, the associated query information being used to be displayed in a predetermined position other than the search box together with a corresponding live identifier, the live identifier being used to indicate that the multimedia content with which the associated query information is associated is being broadcast live, and the initial query information being matched with at least one attribute characteristic of the multimedia content.

The third aspect of the embodiments of the disclosure provides an apparatus for information searching, comprising:
  a receiving module, configured to receive initial query information input in a search box, the initial query information comprising any one of characters, keywords, and key phrases; and
  a first displaying module, configured to display associated query information and a live identifier associated with the initial query information in a predetermined position other than the search box; the live identifier being used to indicate that a multimedia content with which the associated query information is associated is being broadcast live, and the initial query information being matched with at least one attribute characteristic of the multimedia content.

The fourth aspect of the embodiments of the disclosure an apparatus for information searching, comprising:
  a receiving module, configured to receive initial query information which is sent by a client and input in a search box; the initial query information comprising any one of characters, keywords, and keyword phrases;
  a querying module, configured to determine associated query information associated with the initial query information; a multimedia content with which the associated query information is associated being broadcast live; and
  a sending module, configured to send the associated query information to the client, the associated query information being used to be displayed in a predetermined position other than the search box together with a corresponding live identifier, the live identifier being used to indicate that the multimedia content with which the associated query information is associated is being broadcast live, and the initial query information being matched with at least one attribute characteristic of the multimedia content.

The fifth aspect of the embodiments of the disclosure provides a computing device, comprising: a processor, and a memory storing instructions that upon execution by the processor cause the computing device to perform the steps of the method provided by the first aspect of the embodiments of the disclosure.

The sixth aspect of the embodiments of the disclosure provides a computing device, comprising: a processor, and a memory storing instructions that upon execution by the processor cause the computing device to perform the steps of the method provided by the second aspect of the embodiments of the disclosure.

The seventh aspect of the embodiments of the disclosure provides a computer-readable storage medium, storing program instructions that upon execution by a computing device, cause the computing device to perform the steps of the method provided by the first aspect of the embodiments of the disclosure.

The eighth aspect of the embodiments of the disclosure provides a computer-readable storage medium, storing program instructions that upon execution by a computing device, cause the computing device to perform the steps of the method provided by the second aspect of the embodiments of the disclosure.

The above method and apparatus for information searching, the computer device and the computer storage medium provided by the embodiments of the present disclosure can, based on initial query information inputted in a search box, display associated query information associated with the initial query information and a live identifier prompting that there is a related live content directly in a search page presenting the search box. As such, by the combined presentation of the associated query information and the live identifier, the associated query information of existence of the live content is indicated, the attempting to initiate a search on the query information when it is uncertain whether there is corresponding live content can be avoided, which reduces the cost of trial-and-error in finding the live content and improves the live content query efficiency. In addition, since the associated query information with the live identifier of interest can be directly selected in the search page to access the corresponding live content, to a certain extent, it solves the problem that users don't know how to find the live content intended of interest, and the efficiency of obtaining the live content of interest is improved.

For the description of the effects of the above-described apparatus for information searching, the computer device, and the computer-readable storage medium, please refer to the description of the above-described method for information searching, and will not be repeated here.

In order that the above objectives, characteristics, and advantages of the present disclosure can be more clearly understood, preferred embodiments will be described in detail below with reference to the accompanying drawings.

BRIEF DESCRIPTION OF FIGURES

In order to make the technical solutions of the embodiments of the present disclosure clearer, the accompanying drawings corresponding to the embodiments are briefly described below. The accompanying drawings are incorporated herein and constitute a part of the specification, illustrate embodiments consistent with the present disclosure and, together with the description, serve to explain the technical solutions of the present disclosure. It should be understood that the following drawings illustrate only certain embodiments of the present disclosure and are therefore not to be considered as limiting in scope, and other related drawings may be obtained from these drawings without creative effort for those of ordinary skill in the art.

DETAILED DESCRIPTION

Figure 1:
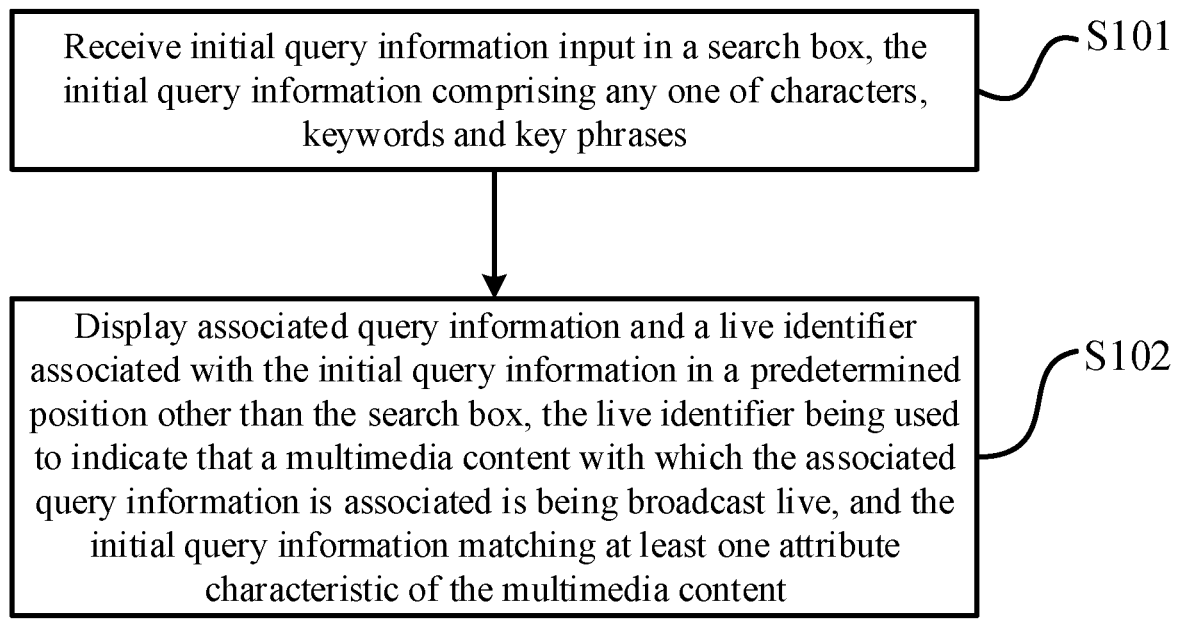
FIG. 1 shows a flowchart of a method for information searching according to an embodiment of the present disclosure.

To make the objectives, technical solutions, and advantages of the embodiments of the present disclosure clearer, a clear and complete description of the technical solutions in the present disclosure will be given below, in conjunction with the drawings corresponding to the embodiments of the present disclosure. Apparently, the embodiments described below are some, but not all, of the embodiments of the present disclosure. The components of the embodiments of the present disclosure generally described and illustrated herein could be arranged and designed in a wide variety of different configurations. Thus, the following detailed description of the embodiments of the disclosure is not intended to limit the scope of the disclosure, as claimed, but is merely representative of selected embodiments of the disclosure. All of the other embodiments, obtained by those of ordinary skill in the art on the basis of the embodiments of the present disclosure without any inventive efforts, fall within the protection scope of the present disclosure.

In general, when a user searches for a live content on a terminal application or a website, a search is initiated by inputting query information first, the live content can be found if there is the corresponding live content in the search result or the input query information needs to be changed if there is no corresponding live content, and the search is initiated again until the corresponding live content is found. The above operations for information searching are prone to wasting time for the user and has a high cost of trial-and-error.

Based on the above studies, an embodiment of the present disclosure provides a method and apparatus for information searching, a computer device and a storage medium, which can, based on initial query information inputted in a search box, directly display associated query information associated with the initial query information and a live identifier prompting that there is a related live content in a search page presenting the search box. As such, by the combined presentation of the associated query information and the live identifier, the associated query information of existence of the live content is indicated, the attempting to initiate a search on the query information when it is uncertain whether there is corresponding live content can be avoided, which reduces the cost of trial-and-error in finding the live content and improves the live content query efficiency. In addition, since the associated query information with the live identifier of interest can be directly selected in the search page to access the corresponding live content, to a certain extent, it solves the problem that users don't know how to find the live content intended of interest, and the efficiency of obtaining the live content of interest is improved.

In view of the defects of the above operations, they are all the results obtained by the inventors after practice and careful study. Therefore, the discovery process of the above problems and the solutions proposed by the present disclosure hereinafter to the above problems should be contributions made by the inventors to the present disclosure during the course of the present disclosure.

It should be noted that like reference numerals and letters represent like items in the following figures, and therefore, once an item is defined in one figure, it need not be further defined and explained in the subsequent figures.

To facilitate an understanding of the present embodiments, first, a method for information searching disclosed by an embodiment of the present disclosure is described in detail, the method for information searching provided by the embodiments of the present disclosure is implemented by a computing device with certain computing capability, which is typically implemented on a client, where the client may be a user terminal corresponding to a server with certain interaction capability.

The method for information searching provided by the embodiment of the present disclosure is explained below taking the executor as a client as an example.

Referring to FIG. 1, which is a flowchart of a method for information searching according to an embodiment of the present disclosure, the method includes steps S101 to S102.

At step S101, initial query information input in a search box is received, the initial query information including any one of characters, keywords, and key phrases.

The search box may be an input box set in the client page for inputting initial query information. In one embodiment, a search box for entering initial query information may be presented in the client's home page or any other page presenting the media content, and the search box may be located anywhere on the page, typically the search box is located at the top of the page.

Figure 2:
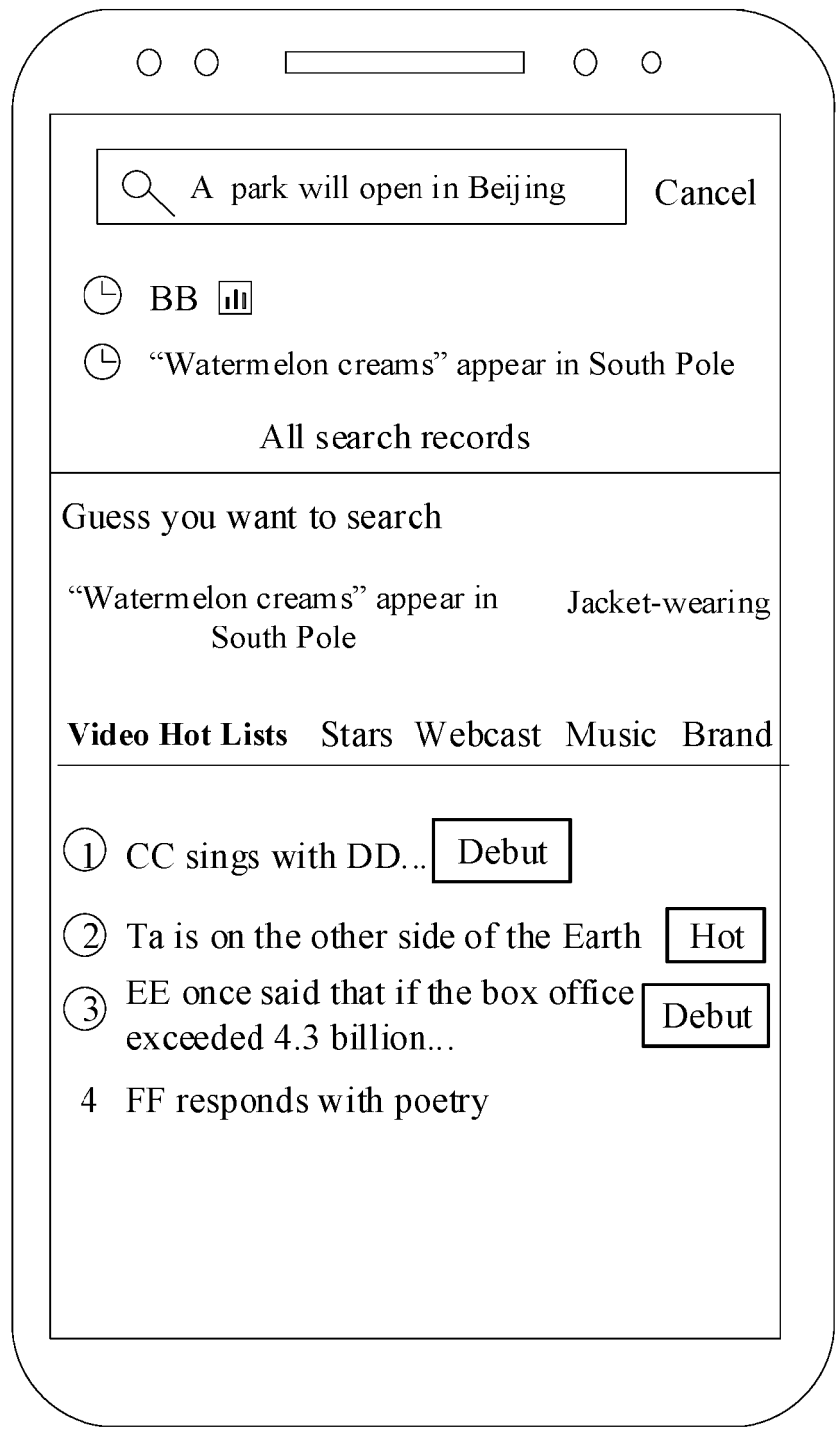
FIG. 2 shows a schematic diagram illustrating a first search page according to an embodiment of the present disclosure.

In one embodiment, after clicking on the search box in the page, a search intermediate page can be entered, on which the search box and recommendation information can be presented. Referring to FIG. 2, which shows a search intermediate page entered after clicking on the search box in the client page, recommended query information may be displayed in the search box of the search intermediate page, and historical query records may be displayed in a predetermined region below the search box.

If there is query information associated with live content in the historical query record, the corresponding live identifier may be presented at the position corresponding thereto. For example, the right side of "BB" is shown with a live indicator indicating that the live content associated with "BB" is currently being live. When there are more historical query records, the remaining historical query records may be fold under the historical query records displayed. In one embodiment, all of the historical query records may be presented in response to a triggering operation that displays all of the historical query records (e.g., clicking on "all search records").

The search intermediate page may also show other recommended information cards, and an information card of "guess you want to search", where the recommended information may be determined based on historical query records of other users or based on historical query records of the current user.

Below the information card of "guess you want to search", information cards with different ranking lists are also displayed, such as lists for stars, webcast, music, etc. Each list shows the ranking of items. Different identifiers can be set for different ranked items, so that users can select interesting items according to the identifiers.

The initial query information may refer to query information input in the search box of the search page when querying the multimedia content. The initial query information may include one or more of a character name, character characteristic information, a geographical name, a product name, a product attribute characteristic, time, and the like.

In an embodiment of the present disclosure, the initial query information may include any one of characters, keywords, and key phrases. The characters may include letters, numbers, operational symbols, and the like. For example, Chinese Pinyin containing a plurality of letters may be used as the initial query information. A keyword may include at least one individual word, and a key phrase may be a phrase that includes at least two words.

In the input process of the initial query information, the initial query information input into the search box will be updated in real time with the addition or deletion of characters, keywords, or key phrases in the search box, in this process, the associated query information matched with the initial query information can be updated according to the initial query information updated in real time. For example, if a word "Three" is input in the search box, the obtained associated query information may include "Triplets", "Three Lives, Three Worlds, Ten Miles of Peach Blossoms" or the like, and when the initial query information input into the search box become a phrase "Three kingdoms" by adding more keywords, the updated associated query information may include "Romance of the Three Kingdoms", "War of the Three Kingdoms" or the like. Please see the description of the following steps for the display of the associated query information.

At step S102, associated query information and a live identifier associated with the initial query information are displayed in a predetermined position other than the search box, the live identifier being used to indicate that a multimedia content with which the associated query information is associated is being broadcast live, and the initial query information being matched with at least one attribute characteristic of the multimedia content.

In an embodiment of the present disclosure, the initial query information is matched with at least one attribute characteristic of the multimedia content, and the attribute characteristics may include attribute characteristics of a plurality of dimensions. In particular, the plurality of dimensions may include dimensions concerning anchors, dimensions concerning virtual live rooms, or dimensions concerning entity objects involved in the live multimedia content. Specifically, the attribute characteristics of the multimedia content can include the attribute characteristic of the dimension concerning anchor (such as the anchor name), the attribute characteristic of the dimension concerning virtual live room (such as the virtual live room name), or the attribute characteristic of the dimension concerning the involved entity object (such as the product name, product brand, attribute information of the product, and the like). The initial query information may match at least one of the attribute characteristics of the plurality of dimensions described above, and thus, exemplarily, the virtual live room name, or the anchor name, or the entity object, etc. may also be included in the initial query information.

In an embodiment of the present disclosure, attribute characteristics of the associated query information are matched with those of the initial query information, and/or the initial query information is included in the associated query information.

In one embodiment, if the multimedia content associated with the initial query information is matched with multiple of the attribute characteristics, associated query information and a live identifier corresponding to the attribute characteristic of a target dimension among the multiple of the attribute characteristics can be displayed in a predetermined position other than the search box, the target dimension being determined based on historical interaction data with which the attribute characteristics of the plurality of dimensions is associated within a recent predetermined time period.

Taking the live content as an example, the live content associated with the initial query information generally has attribute characteristics of multiple dimensions, for example, the live content associated with the initial query information of "read books" includes: a live content in a virtual live room titled "AA (anchor name) reads books"; the live content in the virtual live room can be matched with the attribute characteristics of a plurality of dimensions, such as the dimension concerning anchor, the dimension concerning virtual live room, and the dimension concerning entity object (e.g., books) involved in the virtual live room, and the attribute characteristics may be in turn the anchor name "AA", the live content description "read books" of the virtual live room, and the name of the book involved in the virtual live room. And when need to display the associated query information, the attribute characteristic of the target dimension may be selected from the attribute characteristics of the plurality of dimensions, and candidate query information corresponding to the attribute characteristic of the target dimension may be presented as the associated query information.

In one embodiment, the selection can be made based on the historical interactive data within the latest predetermined time period, which is associated with the attribute characteristics of the plurality of dimensions (i.e., associated with the candidate query information matched with the attribute characteristics). For example, the candidate query information with more search times, comment times, and times appearing in various multimedia content can be selected as the associated query information.

In one embodiment, a user may directly enter the search page to search for information, and it is also possible that during browsing of content (including video content) in streaming pages, a certain content of interest is found, in this case there is a need to initiate a further search for the content or related content to obtain its corresponding live content, in which case, based on the initial query information determined by the content of interest, the initially determined initial query information can be input into the search page, and then the associated query information and live identifier can be obtained.

The predetermined position other than the search box may include a drop-down box of the search box, or a predetermined position in a search intermediate page.

Figure 3:
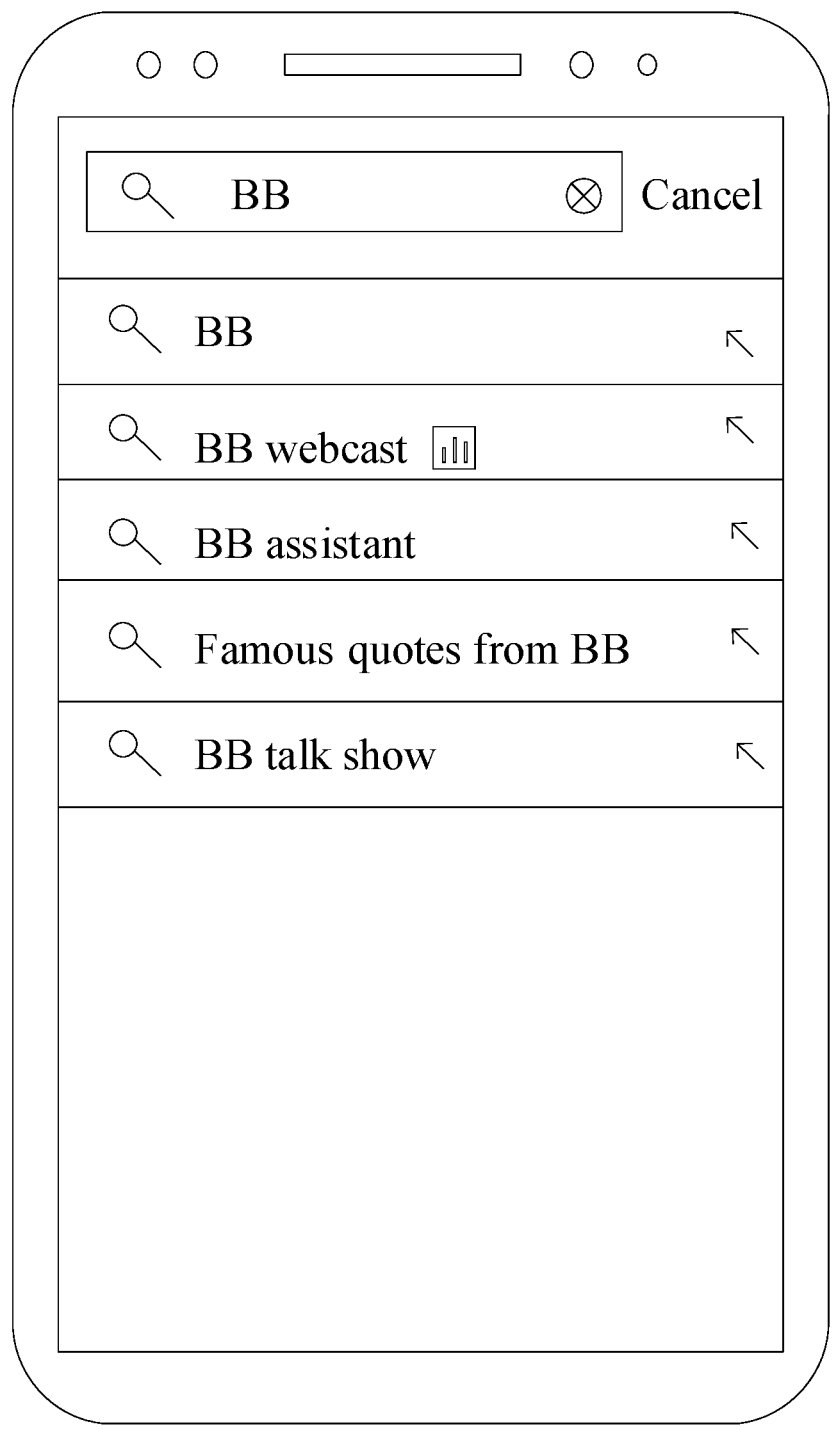
FIG. 3 shows a schematic diagram illustrating a second search page according to an embodiment of the present disclosure.

In particular, in an embodiment, the associated query information may be presented within the drop-down box of the search box, as shown in FIG. 3, after the initial query information "BB" is input in the search box, the drop-down box is presented below the search box, and the associated query information corresponding to "BB" is presented in the drop-down box of the search box, i.e., "BB", "BB webcast", etc.

Figure 4:
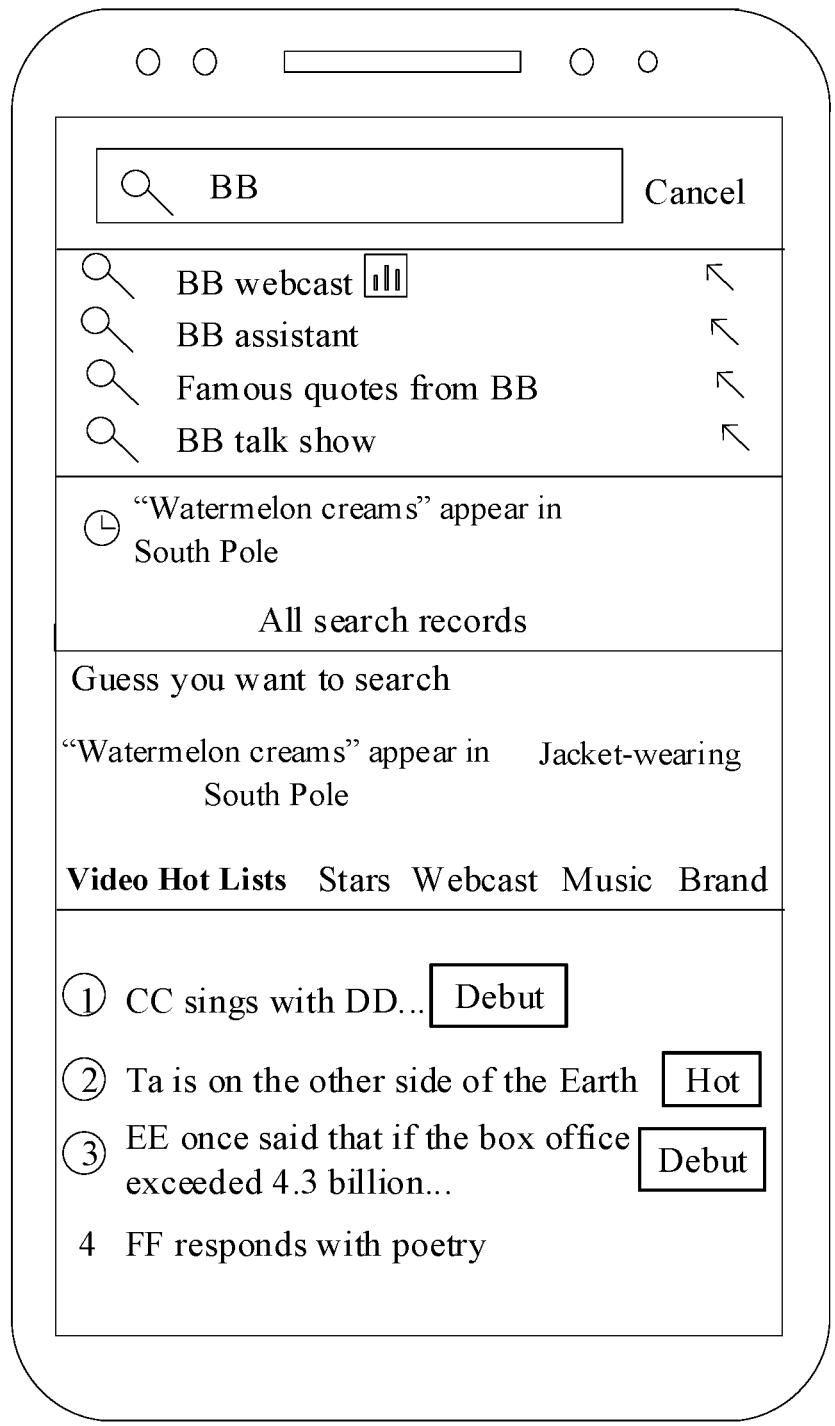
FIG. 4 shows a schematic diagram illustrating a third search page according to an embodiment of the present disclosure.

In another embodiment, the associated query information may also be presented in a predetermined position in the search intermediate page. As shown in FIG. 4, after the initial query information "BB" is input in the search box of the search intermediate page, the associated query information corresponding to "BB" is presented in a predetermined region below the search box and above the historical query records, i.e., "BB", "BB webcast", etc.

In one embodiment, if the multimedia content with which the associated query information is associated is the live content, the live identifier may be presented in synchronization with the associated query information, and the live identifier may indicate that the multimedia content with which the associated query information is associated is being broadcast live. In FIG. 3 or FIG. 4, the multimedia content corresponding to the associated query information "BB webcast" is a live content, so that the live identifier is synchronously shown on the right side of the associated query information "BB webcast".

The live identifier presented in synchronization with the associated query information indicates that the multimedia content corresponding to the associated query information is being broadcast live, so that the user can be prompted which associated query information has the corresponding live content, so that the associated query information having the live content can be selected to initiate a search if the user is desired to watch the live content. In particular, the associated query information or its live identifier can be used to enter a corresponding live page after being triggered.

In an embodiment of the present disclosure, the live identifier can be set in a fixed format, or different formats can be set for different associated query information. In general, to reduce the computational effort of service resources, the live identifier may be set to a fixed format or some pre-set formats. For example, the live identifier may be a live symbol or a live acronym.

In one embodiment, the live identifier can be pre-stored locally at the client, that is, the associated query information associated with the initial query information is obtained, and the locally stored live identifier is extracted, and then the associated query information and the live identifier are presented in a predetermined position other than the search box. The live identifier can be set to a fixed format, and by being stored locally in advance, the amount of information transmission between the server and the client can be reduced, thereby reducing the delay due to the information transmission.

The associated query information may also correspond to other identifiers, such as the identifier indicating that the popularity of the live content is a lot. When the popularity of a certain live content is relatively high or the views is a lot, a "hot" live identifier can be added to the live content, so that the user can accurately and quickly understand the associated query information according to different identifiers, thus helping users selecting the corresponding multimedia content.

After step S102, when a triggering operation is performed for the associated query information (such as triggering the associated query information, or triggering a corresponding live identifier if it exists), the multimedia content corresponding to the associated query information may be presented. The triggering operation may include but not limited to operations such as clicking, long pressing, re-pressing, or other operations, which are not limited herein.

In one embodiment, the matching multimedia content may be presented according to the target attribute characteristic presented by the associated query information. The target attribute characteristic herein may reflect real-time requirements for the multimedia content. For example, in the case where the target attribute characteristic is the anchor name or the virtual live room name, the multimedia content currently being live associated with the anchor name or the virtual live room name can be presented, i.e., the current live content in real time is presented, and in the case where the target attribute characteristic is the entity object that is involved in the live multimedia content, the played back multimedia content that involves the entity object may be presented. For example, when the associated query information is about a commodity or a book, a played back video concerning the commodity or the book can be displayed.

The method for information searching provided by the embodiment of the present disclosure is explained below by taking the executor as a server as an example.

Figure 5:
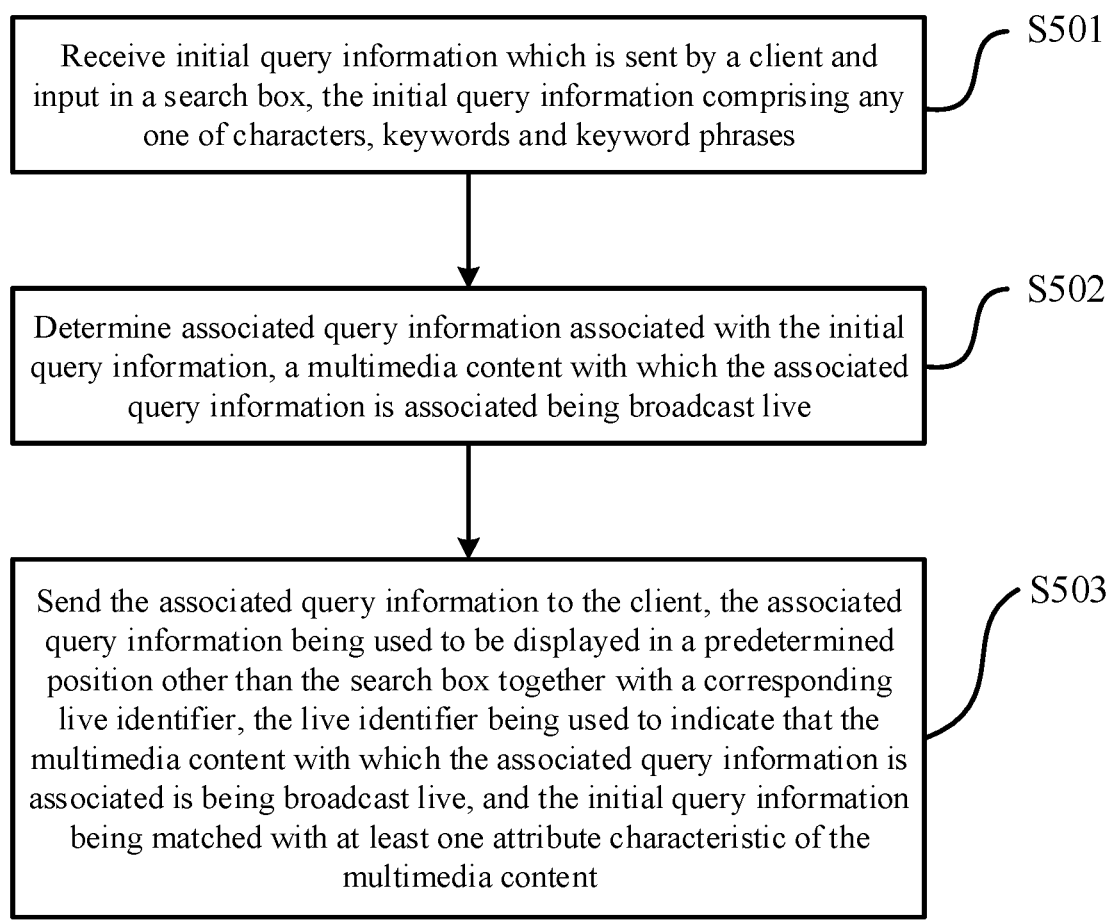
FIG. 5 shows a flowchart of another method for information searching according to an embodiment of the present disclosure.

Referring to FIG. 5, which is a flowchart of another method for information searching according to an embodiment of the present disclosure, the method includes steps S501 to S503, wherein:

S501: initial query information which is sent by a client and input in a search box is received, the initial query information including any one of characters, keywords, and keyword phrases.

The search box may be an input box set in the client page for inputting initial query information.

S502: associated query information associated with the initial query information is determined, a multimedia content with which the associated query information is associated being broadcast live.

In one embodiment, associated query information associated with the initial query information may be queried from a word library based on the initial query information.

Before the associated query information associated with the initial query information is queried, a word library can be established in advance. And in the implementation process, one or more live multimedia content can be acquired (the multimedia content herein can include historical live content, and can also include current live content); then based on the respective multimedia content, attribute characteristics corresponding to the respective multimedia content are extracted; and based on the extracted attribute characteristics, the word library is updated in real time.

In one embodiment, attribute characteristics of the multimedia content in a plurality of dimensions may be extracted, and as previously described, the plurality of dimensions may include a dimension concerning anchor, a dimension concerning virtual live room, a dimension concerning entity objects dimension involved in the live multimedia content, and the like. The attribute characteristic of the dimension concerning anchor may be, for example, an anchor name, the attribute characteristic of the dimension concerning virtual live room may be, for example, a virtual live room name or live content description in the virtual live room, and the like, the attribute characteristic of the dimension concerning the entity object may be, for example, names, brands or attribute information of the items involved in the live content, or names of the characters involved, and the like. For example, for a virtual live room titled "AA live streaming" doing book reading, the attribute characteristics of the plurality of the above-mentioned dimensions are extracted, including an anchor name such as "AA", the live content description of the virtual live room such as "reading books", and a name of the book read in the live streaming such as "One hundred thousand Whys", so that the "AA", "reading books", and "One hundred thousand Whys" can be added to the word library correspondingly.

After the word library is established, the query information in the word library can also be updated in real-time based on the multimedia content updated in real-time to meet the latest query needs. Specifically, for the live content, it is possible to acquire one or more multimedia content currently live, based on the one or more multimedia content currently live, the attribute characteristics corresponding to the respective multimedia content are extracted, and based on the extracted attribute characteristics, the word library is updated in real time.

For example, when a new virtual live room is found or new live streaming is started in an existing virtual live room, the attribute characteristics of a plurality of dimensions can be extracted based on the new multimedia content, and the word library can be updated. In addition, when the entity objects involved in the live multimedia content are changed, for example, some items are added, new associated query information can be determined based on item names, item attribute information, item brands, etc., of the added items, so that the new associated query information can be corresponded to when the input initial query information is received. For another example, when the anchor in the virtual live room changes, for example, the original anchor B is replaced by an anchor A, the associated query information determined according to the anchor B in the word library can be deleted and the association query information determined according to the anchor A can be added. For another example, when the name of the virtual live room is updated, the associated query information determined according to the name of the old virtual live room can be deleted from the word library, and the associated query information determined according to the name of the new virtual live room can be added.

After the word library is established, the associated query information being matched with attribute characteristics of the initial query information may be queried from the word library based on the initial query information; and/or based on the initial query information, the associated query information containing the initial query information is queried from the word library.

In one embodiment, the candidate query information in the word library that matches the initial query information at each of a plurality of dimensions may be queried based on the initial query information; if the candidate query information of a plurality of dimensions matching the initial query information is queried, the candidate query information of a target dimension is selected from the candidate query information of the plurality of dimensions based on interaction data respectively associated with the candidate query information of the plurality of dimensions.

Based on the foregoing description, in the word library, there are candidate query information associated with the attribute characteristics of a plurality of dimensions for the same live content. For example, based on the initial query information "One hundred thousand Whys", the candidate query information corresponding to the attribute characteristics of a plurality of dimensions such as "AA" (anchor name), "reading books", and the like can be searched in the word library, and in the determining of the associated query information, the candidate query information of the target dimension with a high interaction heat can be determined as the associated query information based on the interaction data corresponding to the candidate query information of the plurality of dimensions (such as search times, comment times, etc.). For instance, in the above example, the attribute characteristic of the dimension concerning anchor such as anchor name "AA" with high interaction heat can be selected as the associated query information.

Further, if there are multiple of the candidate query information of the target dimension, for example, there are a plurality of book-reading virtual live rooms that reads "One hundred thousand Whys" such as "BB book-reading", "CC book-reading", etc., in addition to "AA book-reading", then a piece of associated query information is further selected among the multiple of candidate query information. In one embodiment, the associated query information can be selected from the multiple of the candidate query information based on the interaction heat of the multimedia content corresponding to the multiple of the candidate query information of the target dimension within a recent predetermined time period. Specifically, the candidate query information with the highest browsing data (e.g., browsing times) can be selected as the associated query information. For instance, in the above example, the anchor name "AA" of "AA book-reading" with the highest views can be selected as the associated query information.

When the associated query information containing the initial query information is queried from the word library based on the initial query information after the word library is established, the associated query information containing the initial query information may also be looked up in the word library based on semantic similarity, which will not be detailed herein.

S503: the queried associated query information is sent to the client, the associated query information being used to be displayed in a predetermined position other than the search box together with a corresponding live identifier, the live identifier being used to indicate that the multimedia content with which the associated query information is associated is being broadcast live, and the initial query information being matched with at least one attribute characteristic of the multimedia content.

In one embodiment, the live identifier may be a symbol or an acronym indicating live streaming, and may be fixedly set, or may be flexibly set according to different kinds of associated query words, which is not limited herein.

In one implementation, the live identifier may be returned to the client with the corresponding associated query information. In another embodiment, the live identifier may be pre-stored locally at the client, that is, after sending the associated query information to the client, the client extracts the locally stored live identifier, and the associated query information and the live identifier are presented together in a predetermined position other than the search box. Here, the live identifier can be set to a fixed format, and by being stored locally in advance, the traffic of information transmission between the server and the client can be reduced, thereby reducing the delay due to the information transmission.

It will be understood by those skilled in the art that in the above-described methods of the detailed description, the order in which the steps are written does not imply a strict order of execution and constitutes any limitation on the implementation process, and the particular order of execution of the steps should be determined in terms of their functions and possible intrinsic logic.

Based on the same inventive concept, the apparatus for information searching corresponding to the method for information searching shown in FIG. 1 is further provided in an embodiment of the present disclosure, since the principle of solving the problem by the device in the embodiment of the present disclosure is similar to the above-mentioned method for information searching of the embodiment of the present disclosure, the implementation of the apparatus can refer to the implementation of the method for information searching shown in FIG. 1, and the relevant part will not be further elaborated here.

Figure 6:
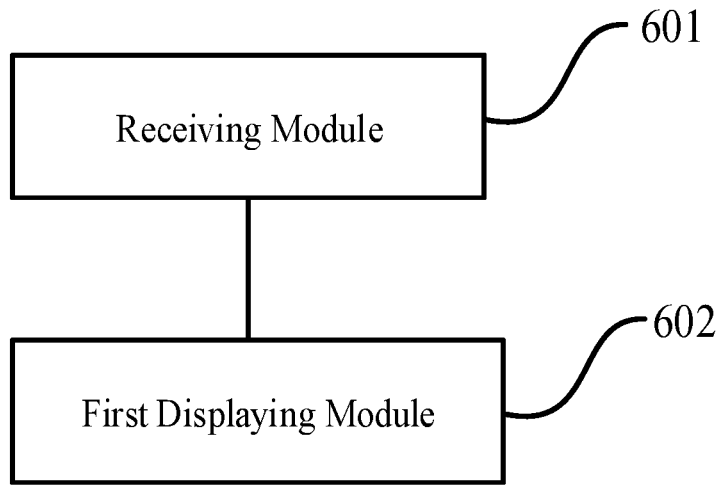
FIG. 6 shows a schematic diagram of an apparatus for information searching according to an embodiment of the present disclosure.

Referring to FIG. 6, a schematic diagram of an apparatus for information searching according to an embodiment of the present disclosure, the apparatus includes:
  a receiving module 601, configured to receive initial query information input in a search box; the initial query information including any one of characters, keywords, and key phrases; and
  a first displaying module 602, configured to display associated query information and a live identifier associated with the initial query information in a predetermined position other than the search box; the live identifier being used to indicate that a multimedia content with which the associated query information is associated is being broadcast live, and the initial query information being matched with at least one attribute characteristic of the multimedia content.

According to the above technical solutions of the embodiments, the associated query information associated with the initial query information and a live identifier prompting that there is a related live content are displayed directly in a search page presenting the search box based on initial query information inputted in the search box. As such, by the combined presentation of the associated query information and the live identifier, the associated query information of existence of the live content is indicated, the attempting to initiate a search on the query information when it is uncertain whether there is corresponding live content can be avoided, which reduces the cost of trial-and-error in finding the live content and improves the live content query efficiency. In addition, since the associated query information with the live identifier of interest can be directly selected in the search page to access the corresponding live content, to a certain extent, it solves the problem that users don't know how to find the live content intended of interest, and the efficiency of obtaining the live content of interest is improved.

In one embodiment, attribute characteristics of the associated query information are matched with those of the initial query information, and/or the initial query information is included in the associated query information.

In one embodiment, the attribute characteristics include attribute characteristics of a plurality of dimensions, the plurality of dimensions including dimensions concerning anchors, dimensions concerning virtual live rooms, or dimensions concerning entity objects involved in the live multimedia content; and
  the first displaying module 602 is further configured to, if the multimedia content associated with the initial query information is matched with attribute characteristics of multiple dimensions, display, in a predetermined position other than the search box, the associated query information and a live identifier associated with the attribute characteristic of a target dimension among the attribute characteristics of multiple dimensions, the target dimension being determined based on historical interaction data with which the attribute characteristics of the plurality of dimensions is associated within a recent predetermined time period.

In one embodiment, the apparatus further includes:
  a response module, configured to determine a target attribute characteristic presented by the associated query information in response to a triggering operation for the associated query information;
  a second displaying module, configured to display, if the target attribute characteristic is an anchor name or a virtual live room name, the multimedia content that is being broadcast live and associated with the anchor name or the virtual live room name; and a third displaying module, configured to display, if the target attribute characteristic is an entity object that is involved in the live multimedia content, a played back multimedia content that involves the entity object.

In one embodiment, the first displaying module 602 is specifically configured to acquire associated query information associated with the initial query information, and extract a live identifier stored locally, and display the associated query information and the live identifier in a predetermined position other than the search box.

Based on the same inventive concept, an apparatus for information searching corresponding to the method for information searching shown in FIG. 5 is further provided in an embodiment of the present disclosure, since the principle of solving the problem by the apparatus in the embodiment of the present disclosure is similar to the method for information searching described above in the embodiment of the present disclosure, the implementation of the apparatus can refer to the implementation of the method for information searching shown in FIG. 5, and the relevant parts are not repeated herein.

Figure 7:
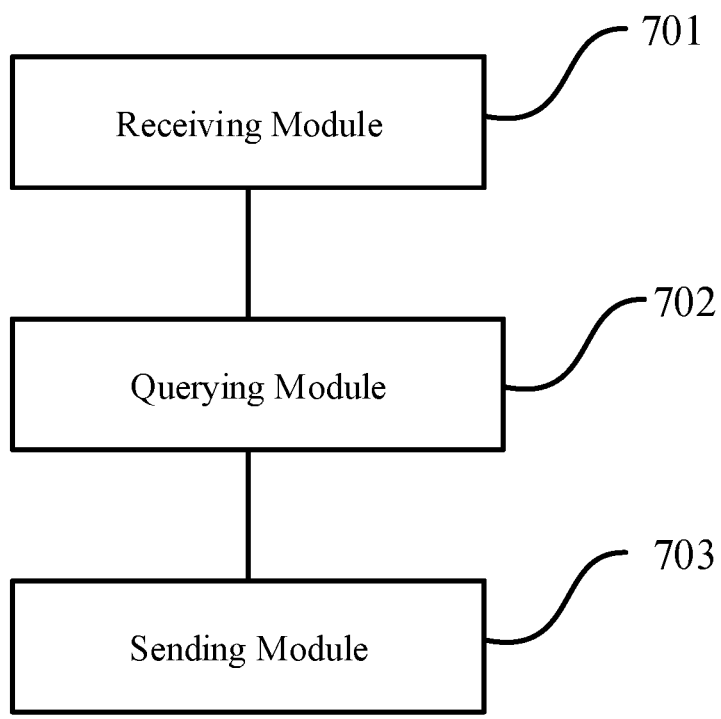
FIG. 7 shows a schematic diagram of another apparatus for information searching according to an embodiment of the present disclosure.

Referring to FIG. 7, a schematic diagram of another apparatus for information searching according to an embodiment of the present disclosure, the apparatus includes:

a receiving module 701, configured to receive initial query information which is sent by a user and is input in a search box; the initial query information including any one of characters, keywords, and keyword phrases;

a querying module 702, configured to determine associated query information associated with the initial query information; a multimedia content with which the associated query information is associated being broadcast live; and a sending module 703, configured to send the associated query information to the client, the associated query information being used to be displayed in a predetermined position other than the search box together with a corresponding live identifier, the live identifier being used to indicate that the multimedia content with which the associated query information is associated is being broadcast live, and the initial query information being matched with at least one attribute characteristic of the multimedia content.

In one embodiment, the querying module 702 is further configured to query, based on the initial query information, associated query information being matched with attribute characteristics of the initial query information from a word library; and/or query, based on the initial query information, associated query information containing the initial query information from a word library.

In one embodiment, the querying module 702 is further configured to query, based on the initial query information, candidate query information of a plurality of dimensions, which matches the initial query information in the word library, the plurality of dimensions including dimensions concerning anchors, dimensions concerning virtual live rooms, or dimensions concerning entity objects involved in the live multimedia content, and if the candidate query information of a plurality of dimensions matching the initial query information is queried, selecting the candidate query information of a target dimension from the candidate query information of the plurality of dimensions as the associated query information based on interaction data associated with the candidate query information of the plurality of dimensions.

In one embodiment, the apparatus further includes:

an acquisition module, configured to acquire live multimedia content;

an extracting module, configured to extract, based on the live multimedia content, attribute characteristics associated with the multimedia content; and an updating module, configured to update a word library in real time based on the extracted attribute characteristics.

In one embodiment, the querying module 702 is particularly configured to, if there are multiple of pieces of the candidate query information of the target dimension, select the associated query information from the multiple of candidate query information based on browsing data of live multimedia content associated with the multiple of candidate query information of the target dimension within a recent predetermined time period.

The description about the process flow of each module in the apparatus, and the interaction flow between modules can refer to the related description in the above method embodiments, which will not be described in detail here.

Figure 8:
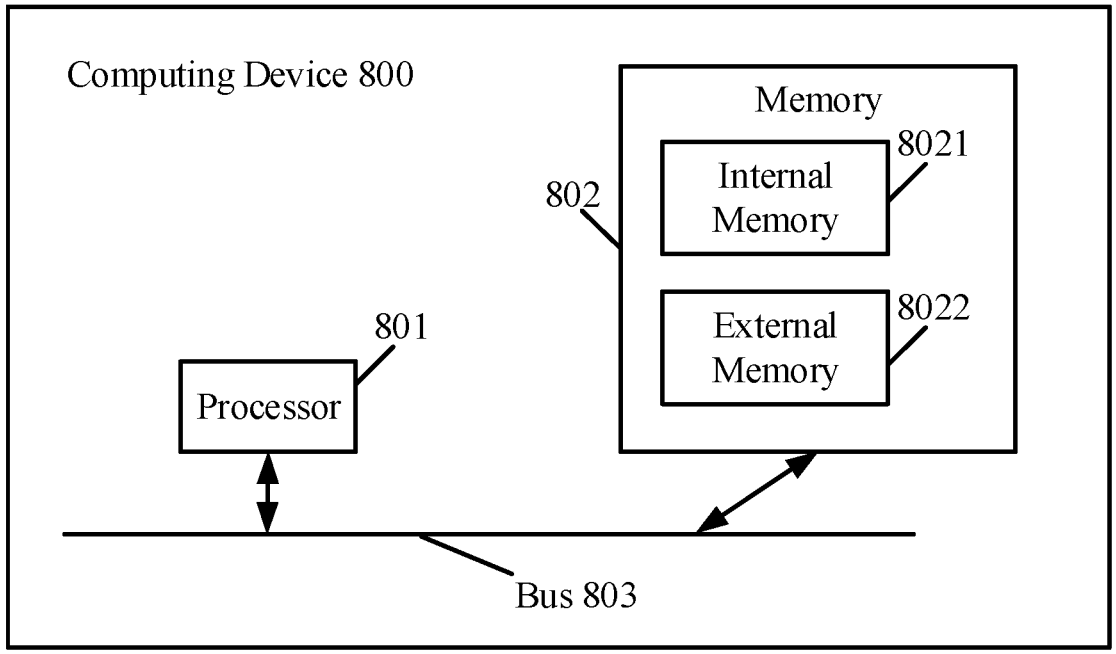
FIG. 8 shows a schematic diagram of a computer device according to an embodiment of the present disclosure.

Based on the same technical concept, the embodiment of the present disclosure also provides a computing device. Referring to FIG. 8, which is a schematic structural diagram of a computing device 800 provided by an embodiment of the present disclosure, the computing device includes a processor 801, a memory 802, and a bus 803. The memory 802 is used for storing execution instructions and includes an internal memory 8021 and an external memory 8022. The internal memory 8021 is also referred to as the internal storage and is used for temporarily storing operation data in the processor 801 and data exchanged with an external memory 8022 such as a hard disk. The processor 801 exchanges data with the external memory 8022 through the internal memory 8021. When the computing device 800 is running, the processor 801 communicates with the memory 802 through the bus 803, so that the processor 801 executes the following instructions:

receiving initial query information input in a search box, the initial query information comprising any one of characters, keywords, and key phrases;

displaying associated query information and a live identifier associated with the initial query information in a predetermined position other than the search box; the live identifier being used to indicate that a multimedia content with which the associated query information is associated is being broadcast live, and the initial query information being matched with at least one attribute characteristic of the multimedia content.

The specific processing flow of processor 801 can refer to the above method embodiments, and will not be repeated herein.

Figure 9:
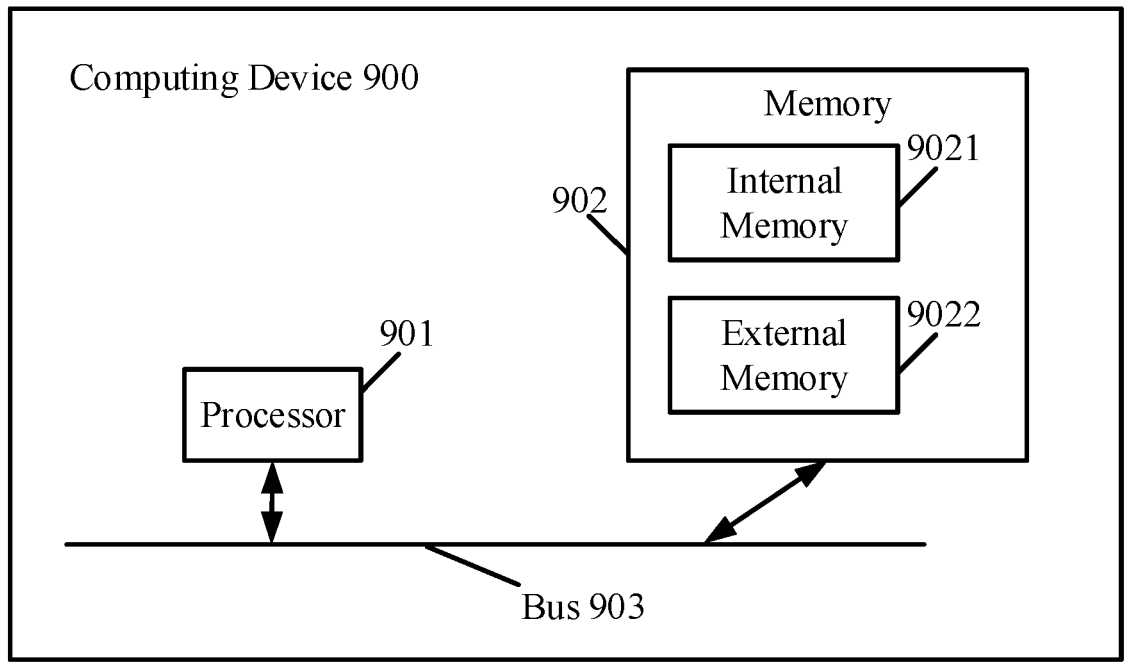
FIG. 9 shows a schematic diagram of another computing device according to an embodiment of the present disclosure.

The embodiment of the present disclosure provides another computing device. Referring to FIG. 9, which is a schematic structural diagram of a computing device 900 provided by an embodiment of the present disclosure, the computing device includes a processor 901, a memory 902, and a bus 903. The memory 902 is used for storing execution instructions and includes an internal memory 9021 and an external memory 9022. The internal memory 9021 is also referred to as the internal storage and is used for temporarily storing operation data in the processor 901 and data exchanged with an external memory 9022 such as a hard disk. The processor 901 exchanges data with the external memory 9022 through the internal memory 9021. When the computing device 900 is running, the processor 901 communicates with the memory 902 through the bus 903, so that the processor 901 executes the following instructions:

receiving initial query information which is sent by a client and input in a search box, the initial query information comprising any one of characters, keywords, and keyword phrases;

determining associated query information associated with the initial query information, a multimedia content with which the associated query information is associated being broadcast live; and sending the associated query information to the client, the associated query information being used to be displayed in a predetermined position other than the search box together with a corresponding live identifier, the live identifier being used to indicate that the multimedia content with which the associated query information is associated is being broadcast live, and the initial query information being matched with at least one attribute characteristic of the multimedia content.

The specific processing flow of processor 901 can refer to the above method embodiments, and will not be repeated herein.

One embodiment of the disclosure further provides a computer readable storage medium, storing computer program that upon execution by a processor, cause the processor to perform the steps of the information searching method described in the method embodiment shown in FIG. 1 above or the steps of the information searching method described in the method embodiment shown in FIG. 5 above. The storage medium may be a volatile or non-volatile computer readable storage medium.

One embodiment of the disclosure further provides a computer program product carrying program code, said program code comprising instructions that can be used to perform the steps of the information searching method described in the method embodiment shown in FIG. 1 above or the steps of the information searching method described in the method embodiment shown in FIG. 5 above, which will not be repeated herein.

The computer program product may be specifically implemented by means of hardware, software, or a combination thereof. In one optional embodiment, said computer program product is embodied specifically as a computer storage medium, and in another optional embodiment, the computer program product is embodied specifically as a software product, such as a Software Development Kit (SDK), and the like.

Those skilled in the art can clearly understand that, for the convenience and simplicity of description, the specific working process of the above-described system and apparatus may refer to the corresponding process in the aforementioned method embodiments, and will not be repeated herein. In several embodiments provided in the disclosure, the disclosed system, apparatus, and method may be implemented in other ways. The above-described apparatus embodiments are only schematic. For example, dividing of the units is only a kind of logical function dividing, and there may be other dividing modes in actual implementation. For another example, the plurality of units or components can be combined or integrated into another system, or some features can be ignored or not executed. On the other hand, the mutual coupling or direct coupling or communication connection shown or discussed may be indirect coupling or communication connection through some communication interfaces, apparatuses, or units, and may be electrical, mechanical or in other forms.

The units or modules described as separate parts may or may not be physically separated, and the parts displayed as units may or may not be physical units, that is, they may be in one place or distributed onto a plurality of network units. Part or all of the units or modules can be selected according to actual needs to implement the objectives of the solutions of the present embodiment.

In addition, each functional unit in each embodiment of the disclosure may be integrated into one processing unit, or each unit may exist physically alone, or two or more units may be integrated into one unit.

The function, if implemented in the form of a software functional unit and sold or used as an independent product, may be stored in a nonvolatile computer readable storage medium that can be executed by a processor. Based on this understanding, the technical solutions of the disclosure essentially, or parts contributing to the prior art, or part of the technical solutions can be embodied in a software product form. A computer software product is stored in a storage medium, including a plurality of instructions used to cause an electronic device (may be a personal computer, a server, a network device, etc.) to execute all or part of the steps of the methods in all the embodiments of the disclosure. The aforementioned storage medium includes: a U disk, a mobile hard disk, a read-only memory (ROM), a random-access memory (RAM), a magnetic disk or an optical disk and other media that can store program codes.

Finally, it should be noted that the above embodiments are only specific implementations of the disclosure and are used to illustrate the technical solutions of the disclosure but not limit it. The protection scope of the disclosure is not limited to this. Although the disclosure has been illustrated in detail with reference to the aforementioned embodiments, those skilled in the art should understand that: any person skilled in the art can still modify or easily think of changes to the technical solutions recorded in the aforementioned embodiments, or make equivalent replacement for part of the technical features thereinto within the technical scope disclosed in the disclosure. However, these modifications, changes or replacements do not make the nature of the corresponding technical solutions separate from the spirit and scope of the technical solutions of the embodiments of the disclosure, and should be covered the protection scope of the disclosure. Therefore, the protection scope of the disclosure should be subjected to the protection scope of the claims.

What is claimed is:

1. A method for information searching, comprising:

receiving initial query information input in a search box on a display of an electronic device, the initial query information comprising any one of characters, keywords, and key phrases;

querying, based on the initial query information, a word library for associated query information containing the initial query information or being matched with attribute characteristics of the initial query information, wherein the querying comprises:

querying, based on the initial query information, candidate query information of a plurality of dimensions, which match the initial query information, the plurality of dimensions comprising dimensions concerning anchors, dimensions concerning virtual live rooms, or dimensions concerning entity objects involved in live multimedia content; and if the candidate query information of a plurality of dimensions matching the initial query information is queried, selecting the candidate query information of a target dimension from the candidate query information of the plurality of dimensions as the associated query information based on interaction data associated with the candidate query information of the plurality of dimensions:
extracting a live identifier stored locally; and
displaying, on the display of the electronic device prior to initiating a search on the initial query information, the associated query information and the live identifier associated with the initial query information in a predetermined position other than the search box, the live identifier being used to indicate that a multimedia content with which the associated query information is associated is being broadcast live, and the initial query information being matched with at least one attribute characteristic of the multimedia content,
wherein the word library is updated according to the following steps:
acquiring live multimedia content;
extracting, based on the live multimedia content, attribute characteristics associated with the multimedia content; and
updating the word library in real time based on the extracted attribute characteristics.

2. The method according to claim 1, wherein attribute characteristics of the associated query information are matched with those of the initial query information.

3. The method according to claim 1, further comprising:
determining a target attribute characteristic presented by the associated query information in response to a triggering operation for the associated query information;
displaying, if the target attribute characteristic is an anchor name or a virtual live room name, the multimedia content that is being broadcast live and associated with the anchor name or the virtual live room name; and
displaying, if the target attribute characteristic is an entity object that is involved in the live multimedia content, a played back multimedia content that involves the entity object.

4. The method according to claim 1, wherein the associated query information comprises the initial query information.

5. The method according to claim 1, wherein the selecting the candidate query information of a target dimension from the candidate query information of the plurality of dimensions as the associated query information comprises:
if there are multiple of the candidate query information of the target dimension, selecting the associated query information from the multiple of the candidate query information based on browsing data of live multimedia content associated with the multiple of the candidate query information of the target dimension within a recent predetermined time period.

6. The method of claim 1, further comprising:
receiving an indication to initiate a search for the associated query information; and
entering a corresponding live page in response to the search for the associated query information.

7. A method for information searching, comprising:
acquiring live multimedia content;
extracting, based on the live multimedia content, attribute characteristics associated with the multimedia content;
updating a word library in real time based on the extracted attribute characteristics;
receiving initial query information which is sent by a client and input in a search box on a display of the client, the initial query information comprising any one of characters, keywords, and keyword phrases;
determining associated query information associated with the initial query information, a multimedia content with which the associated query information is associated being broadcast live wherein the determining associated query information associated with the initial query information comprises querying, based on the initial query information, associated query information containing the initial query information or being matched with attribute characteristics of the initial query information from the word library; and
sending, prior to initiating a search on the initial query information, the associated query information to the client, the associated query information being used to be displayed in a predetermined position on the display of the client other than the search box together with a corresponding live identifier, the live identifier being used to indicate that the multimedia content with which the associated query information is associated is being broadcast live, and the initial query information being matched with at least one attribute characteristic of the multimedia content.

8. The method according to claim 7, wherein the querying, based on the initial query information, associated query information containing the initial query information or being matched with attribute characteristics of the initial query information from a word library comprises:
querying, based on the initial query information, candidate query information of a plurality of dimensions, which matches the initial query information in the word library, the plurality of dimensions comprising dimensions concerning anchors, dimensions concerning virtual live rooms, or dimensions concerning entity objects involved in the live multimedia content; and
if the candidate query information of a plurality of dimensions matching the initial query information is queried, selecting the candidate query information of a target dimension from the candidate query information of the plurality of dimensions as the associated query information based on interaction data associated with the candidate query information of the plurality of dimensions.

9. The method according to claim 8, wherein the selecting the candidate query information of a target dimension from the candidate query information of the plurality of dimensions as the associated query information comprises:
if there are multiple of the candidate query information of the target dimension, selecting the associated query information from the multiple of the candidate query information based on browsing data of live multimedia content associated with the multiple of the candidate query information of the target dimension within a recent predetermined time period.

10. An apparatus for information searching, comprising:
at least one processor; and
at least one memory communicatively coupled to the at least one processor and storing instructions that upon execution by the at least one processor cause the apparatus to:

receive initial query information input in a search box on a display of the apparatus, the initial query information comprising any one of characters, keywords, and key phrases;

query, based on the initial query information, a word library for associated query information containing the initial query information or being matched with attribute characteristics of the initial query information, wherein the querying comprises:

querying, based on the initial query information, candidate query information of a plurality of dimensions, which match the initial query information, the plurality of dimensions comprising dimensions concerning anchors, dimensions concerning virtual live rooms, or dimensions concerning entity objects involved in live multimedia content and if the candidate query information of a plurality of dimensions matching the initial query information is queried, selecting the candidate query information of a target dimension from the candidate query information of the plurality of dimensions as the associated query information based on interaction data associated with the candidate query information of the plurality of dimensions;

extract a live identifier stored locally; and display, on the display of the apparatus prior to initiating a search on the initial query information, the associated query information and a live identifier associated with the initial query information in a predetermined position other than the search box; the live identifier being used to indicate that a multimedia content with which the associated query information is associated is being broadcast live, and the initial query information being matched with at least one attribute characteristic of the multimedia content, wherein the word library is updated according to the following steps:

acquiring live multimedia content;

extracting, based on the live multimedia content, attribute characteristics associated with the multimedia content; and updating the word library in real time based on the extracted attribute characteristics.

11. An apparatus for information searching, comprising:

at least one processor; and at least one memory communicatively coupled to the at least one processor and storing instructions that upon execution by the at least one processor cause the apparatus to:

acquire live multimedia content;

extract, based on the live multimedia content, attribute characteristics associated with the multimedia content;

update a word library in real time based on the extracted attribute characteristics;

receive initial query information which is sent by a client and input in a search box on a display of the client; the initial query information comprising any one of characters, keywords, and keyword phrases;

determine associated query information associated with the initial query information; a multimedia content with which the associated query information is associated being broadcast live, wherein to determine the associated query information associated with the initial query information the at least one processor is configured to query, based on the initial query information, associated query information containing the initial query information or being matched with attribute characteristics of the initial query information from the word library; and send, prior to initiating a search on the initial query information, the associated query information to the client, the associated query information being used to be displayed in a predetermined position on the display of the client other than the search box together with a corresponding live identifier, the live identifier being used to indicate that the multimedia content with which the associated query information is associated is being broadcast live, and the initial query information being matched with at least one attribute characteristic of the multimedia content.

* * * * *